United States Patent [19]
Paratte

[11] Patent Number: 5,513,027
[45] Date of Patent: Apr. 30, 1996

[54] LIQUID CRYSTAL DISPLAY DEVICE CAPABLE OF DISPLAYING CHANGEABLE SYMBOLS USING TWO SUBSTRATES

[75] Inventor: Daniel Paratte, Neuchâtel, Switzerland

[73] Assignee: ETA Sa Fabriques d'Ebauches, Grenchen, Switzerland

[21] Appl. No.: 331,098

[22] Filed: Oct. 28, 1994

[30] Foreign Application Priority Data

Nov. 4, 1993 [FR] France .................................. 93 13121

[51] Int. Cl.⁶ .................................................. G02F 1/1343
[52] U.S. Cl. .................................................. 359/87; 359/89
[58] Field of Search ............................ 359/87, 88, 89, 359/54

[56] References Cited

U.S. PATENT DOCUMENTS

| | | | |
|---|---|---|---|
| 3,781,080 | 12/1973 | Aftergut | 359/89 |
| 3,902,790 | 9/1975 | Hsieh | 359/89 |
| 4,270,846 | 6/1981 | Miyamoto | 359/54 |
| 4,403,832 | 9/1983 | Tanaka | 359/53 |
| 4,435,046 | 3/1984 | Nishimura | 359/89 |
| 4,522,691 | 6/1985 | Suginoya et al. | 345/87 |
| 4,540,242 | 9/1985 | Shibuya | 359/89 |
| 4,617,563 | 10/1986 | Fujiwara et al. | 205/122 |
| 4,834,506 | 5/1989 | Demke et al. | 359/89 |
| 5,058,996 | 10/1991 | Washizuka | 359/89 |
| 5,233,449 | 8/1993 | Shioji | 359/87 |

FOREIGN PATENT DOCUMENTS

| | | | |
|---|---|---|---|
| 0297264 | 1/1989 | European Pat. Off. | |
| 107621 | 6/1985 | Japan | 359/88 |
| 209416 | 9/1987 | Japan | 359/53 |
| 2134684 | 8/1984 | United Kingdom. | |

OTHER PUBLICATIONS

Japanese Application No. 55-9169, Patent Abstracts of Japan, vol. 4, No. 35 (P-3) (517), Mar. 25, 1980.

*Primary Examiner*—Anita Pellman Gross
*Assistant Examiner*—Tiep H. Nguyen
*Attorney, Agent, or Firm*—Pollock, Vande Sande & Priddy

[57] ABSTRACT

The invention concerns a liquid crystal display device comprising first display electrodes (31–48) and a set of second elongated display electrodes (50–56) formed on a first substrate (11;250) (10;251), and a set of elongated counter electrodes (70–129; 300–359) formed on a second substrate (10;251) facing the first substrate (11;250) and superposed with said second display electrodes (50–56) so as to create a matrix display of display elements. The counter electrodes (70–129; 300–359) are juxtaposed along substantially their whole length. The counter electrodes are also superposed with the first display electrode so as to display a fixed display symbol. Furthermore, the distance separating the counter electrodes (70–129; 300–359) from each other is substantially less than the width of said first display electrode (31–38).

3 Claims, 6 Drawing Sheets

LIQUID CRYSTAL DISPLAY DEVICE CAPABLE OF DISPLAYING CHANGEABLE SYMBOLS USING TWO SUBSTRATES

FIELD OF THE INVENTION

The present invention concerns a liquid crystal display device and more particularly such a device for displaying fixed display symbols at the same time as changeable display symbols.

BACKGROUND OF THE INVENTION

Normal liquid crystal display devices have a relatively simple structure. They are formed essentially by two separated substrates, at least one of which is transparent, a liquid crystal compound enclosed between the substrates and conducting electrodes arranged on opposing faces of the substrate which face each other and which are arranged in such a way as to represent different displaying symbols. A voltage source is arranged so as to apply a field between the electrodes in the space formed between the substrates. The applied field acts upon the liquid crystal compound to change its transmission or reflection characteristics.

These liquid crystal display devices are used in numerous applications and in particular in pocket calculators, wristwatches, measuring instruments, pagers and several other electronic instruments. The advantage of such display devices resides in the fact that they can be controlled directly by microplates for integrated circuits and that they can display several symbols in a reduced space.

FIGS. 1 and 2 are plane views respectively on the front face of a first substrate 1 and the back face of second substrate 2 of a liquid crystal display device of a known kind. The two substrates or plates 1 and 2 are both provided with a set of electrodes. The electrodes on each plate are subdivided into those forming fixed display symbols and those which are grouped together to form seven segments in a shape of an "8".

Because there are many electrodes, only some of these electrodes on the two plates have been designated by references. Thus, the electrodes on the plates 1 and 2 forming fixed symbols, such as the words "OFF", "ON" and "AUTO", are respectively designated by the references 1.1, and 2.1, while the electrodes forming the groups of seven segments are designated by the references 1.2 and 2.2.

All the electrodes are arranged on the inside of a sealed frame 3 which forms with the two plates 1 and 2 a cell on the inside of which is enclosed a liquid crystal film 4. Connection terminals 1.3 are arranged on the front plate 1, outside of frame 3. Conductive tracks 1.4 connect these terminals to the electrodes 1.1 and 1.2. Certain terminals 1.3, designated by the references 1.31, 1.32 and 1.33, are connected to the electrodes on plate 2 by the means of connection bridges (non represented A, B and C) which connect the two substrates to each other at the level of the frame 3.

The electrodes of plate 2 are subdivided into three parts, to which are respectively connected the three terminals 1.31, 1.32 and 1.33. The first part 5 reunites all the electrodes 2.1 forming the fixed symbols and all the electrodes 2.2 forming a first segment of the seven segment in the shape of an "8". The second part 6 reunites all the electrodes 2.2 forming the second, third and fourth segments of the seven segments in the shape of a "8". The third part 7 reunites all the electrodes 2.2 forming the fifth, sixth and seventh segments of the seven segments in the shape of an "8". The parts 5, 6 and 7 are respectively connected to terminals 1.33, 1.31 and 1.32.

To display a fixed symbol, for example the word "ON", a voltage is applied between electrode 7 and a terminal 1.34, which is connected indirectly to electrodes 1.1 having form of the word "ON". The resulting field created by the superposed parts of electrodes 1.1 forming the word "ON" and the electrode 7 change the optical characteristics of the liquid crystal display device, so as to display this word.

To display a changeable symbol by way of electrodes 2.2 forming the groups of seven segments in the shape of an "8", for example to display a "3" at the position on the plate 1 designated by the reference 8, a voltage is applied between terminals 1.35 and 1.36 and the terminals 1.31, 1.32 and 1.33. As in the above case, the resulting field between the superposed parts of the electrodes 1.2 forming the group of seven segments at the extreme left of plate 1 (as can be seen on FIG. 1) and the electrodes 5, 6 and 7, change the optical characteristics of the liquid crystal display device so as to display the number "3" at position 8.

Although the device described hereabove is capable of displaying at the same time fixed symbols and changeable symbols, a need currently exists for more flexibility in the kind of the information which can be displayed by the part capable of displaying changeable symbols. By using groups of symbols of seven segments in the shape of an "8", the kind of information which can be displayed by this part is limited to simple alphanumerical representations that is the numbers "0" to "9", the symbol "–" and the letters of the alphabet. Furthermore, a certain confusion is possible between several characteristics, for example between "B" and an "8", or between "2" and a "Z".

The patent U.S. Pat. No. 4,522,691 describes a display device having several display electrodes formed in parallel on the surface of a first substrate and several counter-electrodes formed in parallel on the surface of a second substrate spaced apart from the first substrate. The display electrodes and the counter electrodes are orientated so that their directions cross each other at a straight angle, thus forming a matrice of displaying elements of which each element may be selected by applying selectively a switching voltage between one of the display electrodes and one of the counter electrodes. This device constitutes a matrix display which can display changeable symbols according to a known multiplexing system, thus offering a great flexibility for the kind of symbols which may be displayed, than the one which may be realized with a display using seven segments.

However the display device described in this document cannot be obtained by adapting the construction used for the display device illustrated in FIGS. 1 and 2 as described hereabove. When considering FIG. 3 of the patent U.S. Pat. No. 4,522,691, it can be seen that both the display electrodes and the counter electrodes cross the entire surface of the substrate on which they have been respectively formed in such a way that they are occupying this entire surface.

SUMMARY OF THE INVENTION

If one wishes to replace in FIGS. 1 and 2 the electrodes 1.2 and 2.2 intended for displaying changeable information by the display electrodes and the counter electrodes of U.S. Pat. No. 4,522,691, there would not be enough space on the two substrates to arrange the electrodes 1.1 and 2.1 for displaying fixed information. This problem is particularly pertinent in the field of clocks and other applications such as pagers, because in this case the dimensions of the display device are generally small which imposes severe constraints on the arrangement of the electrodes.

However, it may be desirable to display fixed symbols such as illustrated in FIG. 1 by using a matrix display of the kind which can display changeable information. This arrangement, however, would represent an inconvenience by requiring complex software for ensuring displaying of a symbol which will always have a fixed form. Furthermore, the dimensions and the resolution of fixed symbols and of changeable symbols should necessarly be the same, which is not always desirable if, for example, the fixed symbols have a less important meaning than the changeable symbols.

As a result, an aim of the invention is to provide a liquid crystal display device which improves upon the prior art or which can ameliorate or overcome its disavantages.

Another aim of the invention is to provide an improved liquid crystal display device allowing the display of changeable symbols as well as fixed symbols.

The invention thus has as object a display device comprising:
- a first substrate and a second substrate spaced apart and facing each other,
- a liquid crystal film switchable being two states which are optically perceptible, said film being enclosed in the space delimited by said first and second substrates,
- at least a first display electrode formed on the face of said first substrate which faces said second substrate,
- a set of second elongated display electrodes formed on the face of said first substrate facing said second substrate, and
- a set of elongated counter-electrodes formed on the face of said second substrate facing said first substrate, said counter-electrodes being superposed with said second display electrodes so as to be capable of displaying therewith symbols which are changeable by selective application of a switching voltage therebetween, said display device being characterised in that said second display electrodes are juxtaposed in a first general direction across substantially the entire length of said first substrate, in that said counter-electrodes are juxtaposed across substantially the entire width of said second substrate and substantially their whole length in a second general direction perpendicular to said first general direction so as to create a matrix of display elements for forming said changeable display symbols, in that said counter electrodes are also superposed with said first display electrode so as to create therewith a fixed display symbol when a switching voltage is applied therebetween, in that the distance separating each adjacent counter-electrode is substantially less than the width of said first display electrode.

BRIEF DESCRIPTION OF THE DRAWINGS

The invention will now be described in a more detailled manner by referring to the accompagning drawings, which are given solely as an example, and in which.

DETAILED DESCRIPTION OF THE INVENTION

Figure 1:
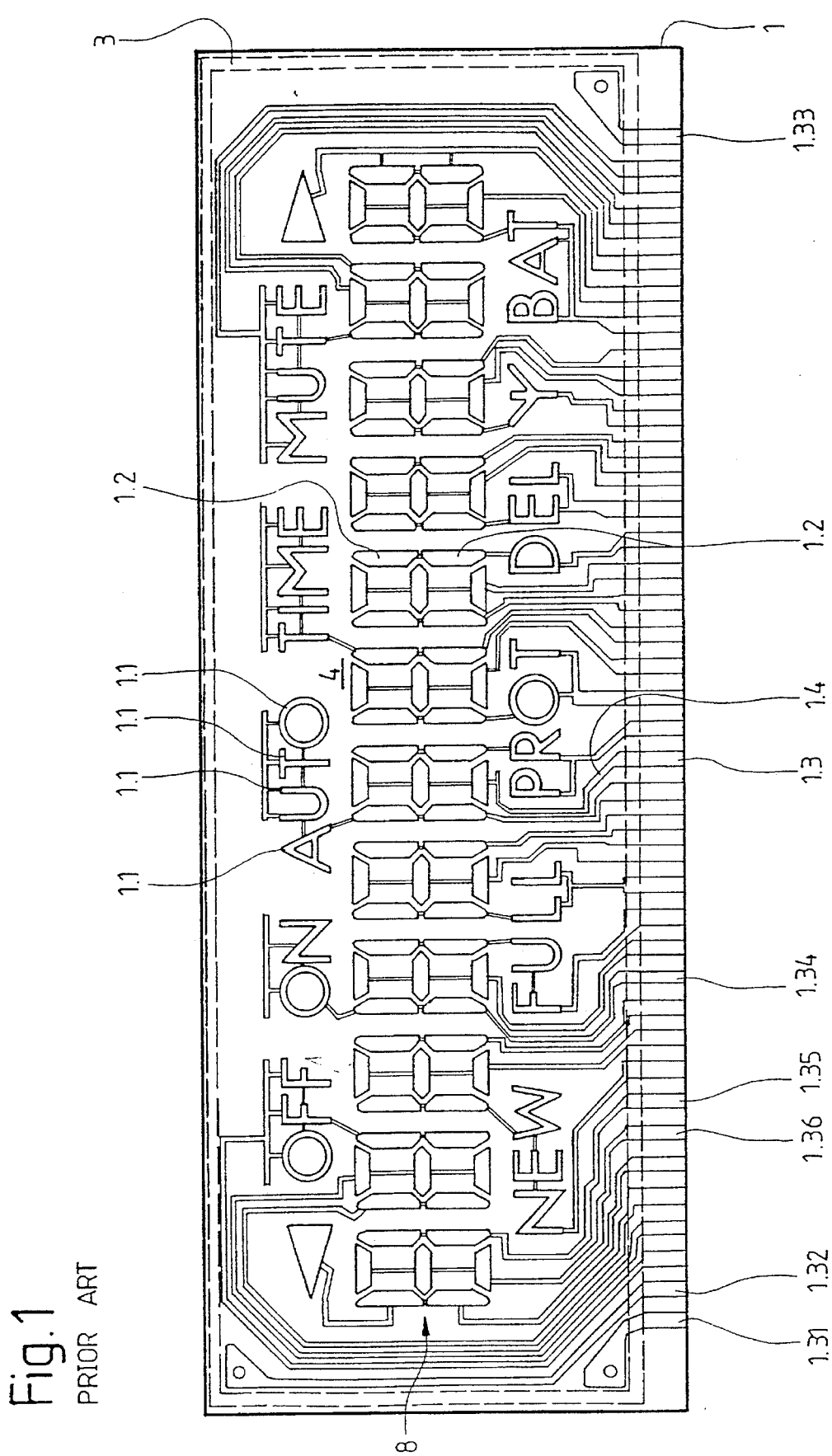
FIG. 1, already described, is a plane view of a first substrate of a known liquid crystal display device comprising display electrodes formed on one of its faces.
Figure 2:
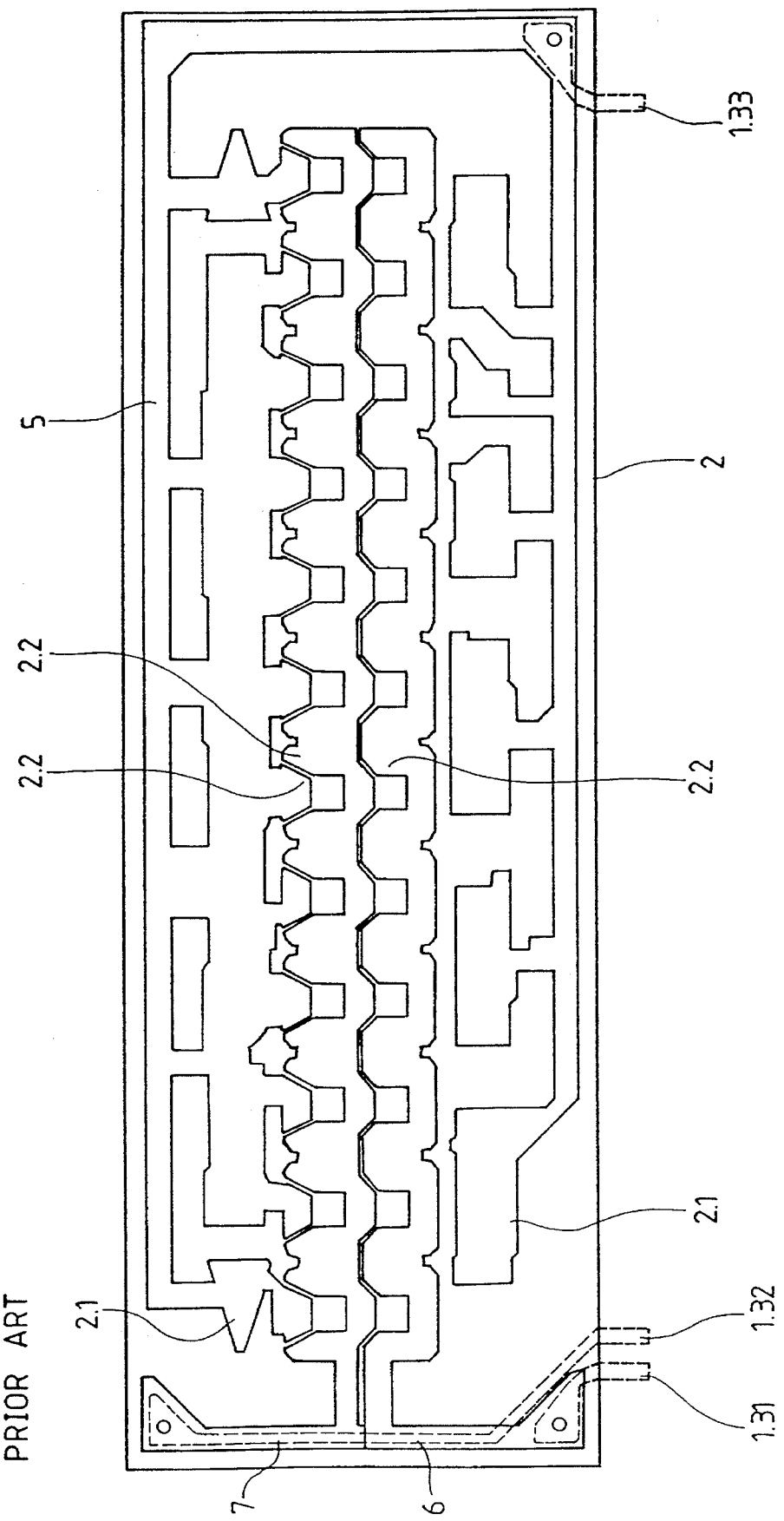
FIG. 2 also already described, is a plane view of a second substrate of the liquid crystal display device of FIG. 1 comprising counter electrodes formed on one of its faces.
Figure 3:
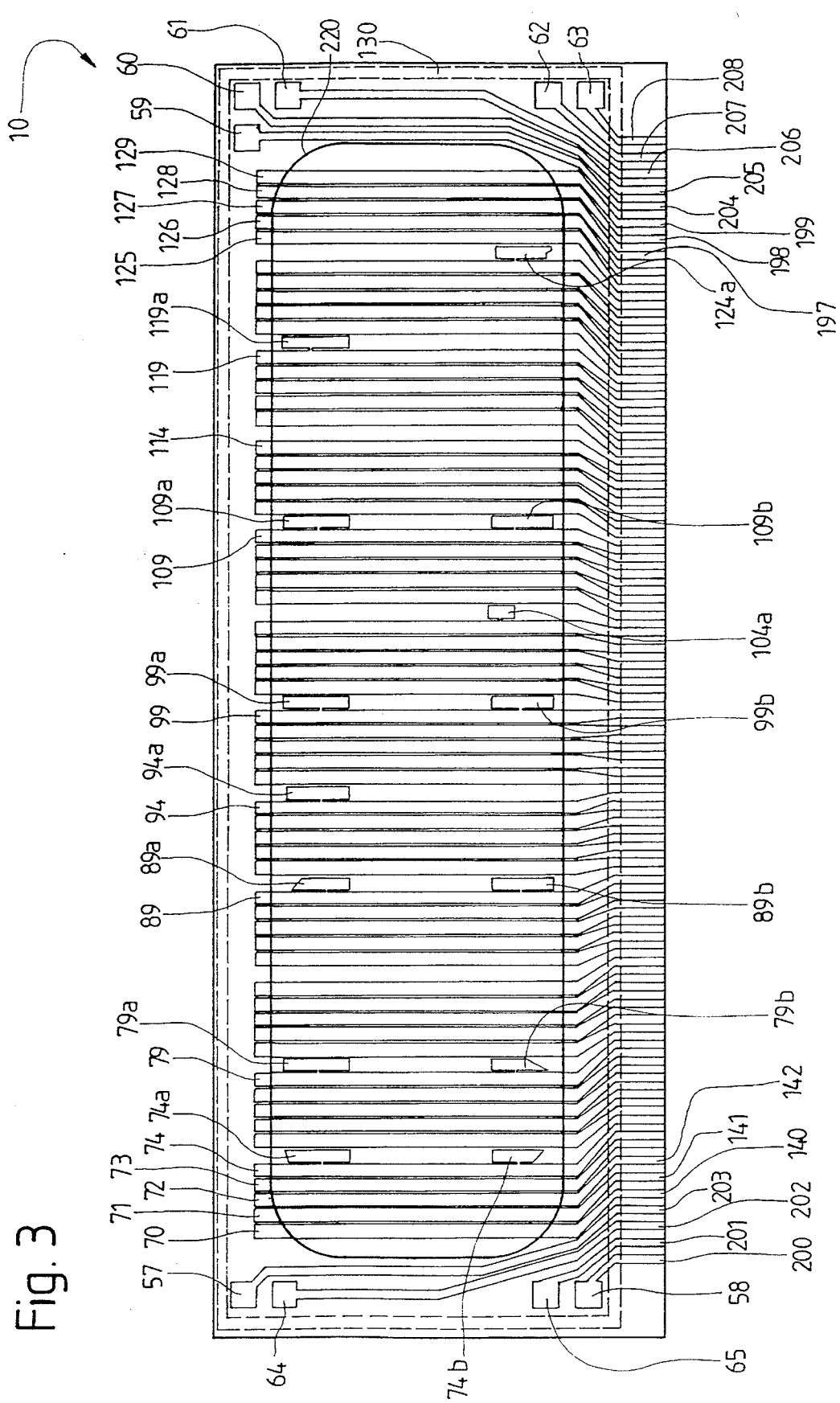
FIG. 3 is a plane view of a first substrate of a first embodiment of the liquid crystal display device according to the present invention, the substrate comprising display electrodes formed on one of its faces.
Figure 4:
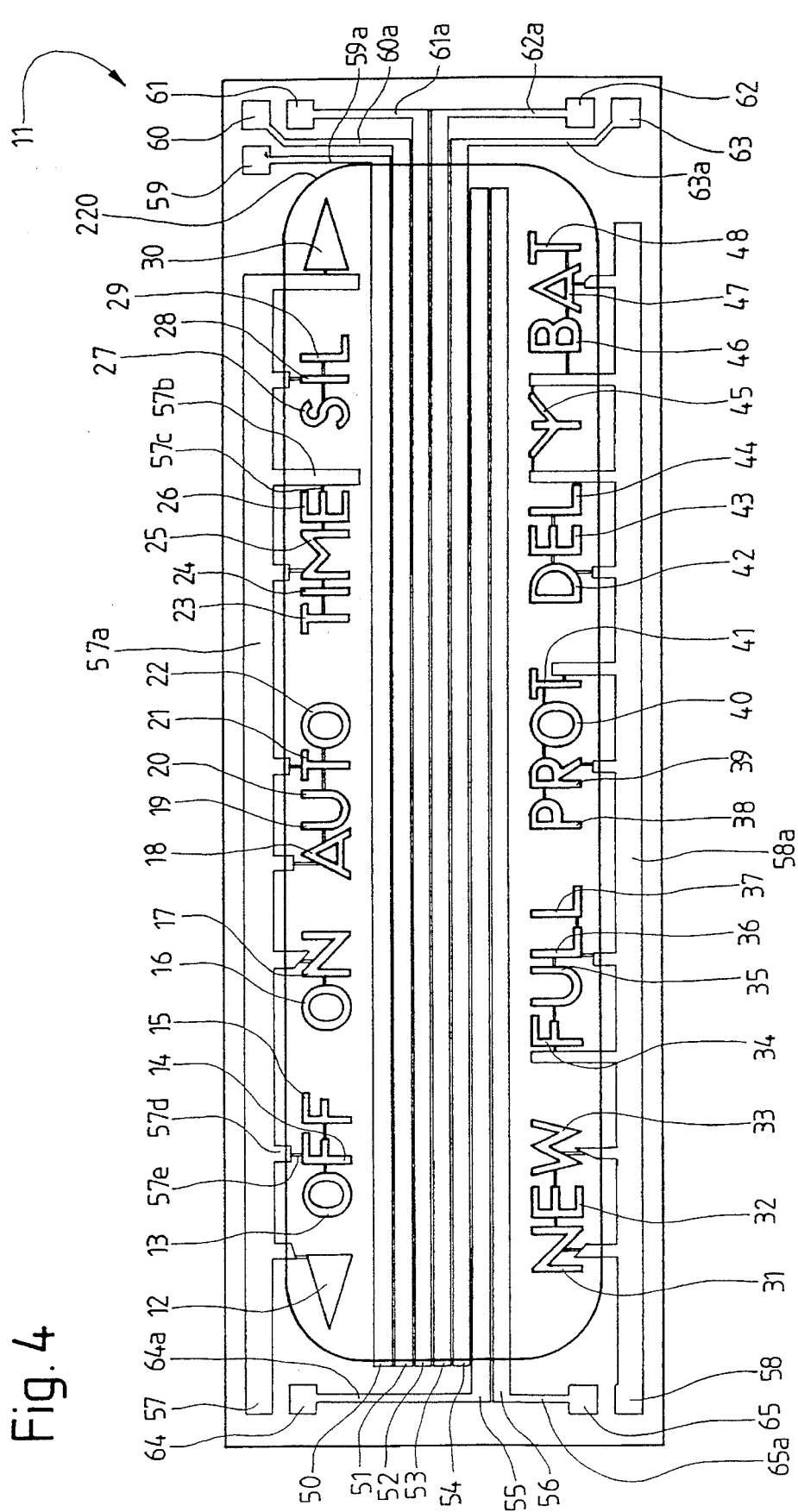
FIG. 4 is a plane view of a second substrate of the liquid crystal display device of FIG. 3, the second substrate comprising counter electrodes formed on one of its faces.

In FIGS. 3 and 4, to which reference will be made now, plane views have been represented of a first front substrate 10 and a second back substrate 11 of a first embodiment of a liquid crystal display device according to the present invention. The substrates 10 and 11 are preferably made of glass or of a plastic material such as MYLAR®, a polycarbonate or of Plexiglass®. The substrates are provided with electrodes which are at least partially superposed so as to allow the displaying of several symbols when a switching tension is applied selectively across them.

The display electrodes intended to form fixed symbols are formed on substrate 11. These electrodes are designated by the references 12 to 48 and have each the form of a letter ("O", "F", "F", etc.) or of another fixed symbol.

On the same face of the substrate 11 a set of second elongated display electrodes are formed which are intended to form changeable symbols. These electrodes are designated by the references 50 to 56 and are juxtaposed on the surface of substrate 11 according to a first general direction. Preferably, these second electrodes are in general rectilinear and extend across substantially the entire length of the surface of substrate 11.

All the electrodes 12 to 30 are connected together at a connection brigde 57 by a conduction track 57a, while all the electrodes 31 to 48 are connected together at a connection bridge 58 by a conduction track 58a. The electrodes 50 to 56 are respectively connected to connection bridges 59 to 65 by conduction tracks 59a to 65a.

Also, a set of elongated counter electrodes intended to form changeable symbols in combination with the electrodes 50 to 56, is formed of one of the faces of substrate 10. These electrodes are designated by the references 70 to 129 and are juxtaposed on the surface of substrate 10 according to a second general direction perpendicular to the first general direction. Preferably, the counter electrodes are in general rectilinear and extend across substantially the entire width of the surface of substrate 10.

All the electrodes 70 to 129 are provided at the inside of a sealing frame 130 which forms together with the substrate 10 and 11, a cell at the inside of which is enclosed a liquid crystal film. Terminals 140 to 199 are arranged on substrate 10, outside of the frame 130, and are connected respectively to electrodes 70 to 129. Furthermore, terminals 200 to 208 are also arranged on substrate 10 to enssure the connection with the electrodes on substrate 11, respectively by the intermediate of connection bridges 58, 65, 64, 57, 59, 60, 61, 62 and 63.

Electrodes 70 to 129 and 50 to 56 of the liquid crystal display device represented in FIGS. 3 and 4 form a matrix display of displaying elements of which a combination of elements may be selected to allow the displaying of several changeable symbols.

Furthermore, some of the counter electrodes 70 to 129 are superposed with display electrodes 12 to 48 so as to fonction as a counter electrode for cooperating with them so that counter electrodes which would be associated exclusively to these electrodes 12 to 48 may be avoided.

The counter electrodes formed on substrate 10 may be subdivided into several groups of which each one, for example the group formed of electrodes 70 to 74, is intended to display a particular displaying symbol. These groups of electrodes may be spaced apart laterally relative to each other so as to improve the readability of the displaying symbols. In the case that at least one part of one of the display electrodes 12 to 48 is superposed at the space between two groups of electrodes, the set of counter electrodes of substrate 10 may further comprise at least one partial electrode situed in this space to fonction as a part of a counter electrode cooperating with the respective display electrodes 12 to 48.

In the embodiment illustrated in FIG. 3, counter electrodes parts are designated by the references 74a, 74b, 79a, 79b, 89a, 89b, 94a, 99a, 99b, 104a, 109a, 109b, 199a and 124a. Each of the counter electrodes parts may connected by a conduction track (non represented) to at least one of the adjacent counter electrodes.

The display device illustrated in FIGS. 3 and 4 may further comprise a displaying screen arranged within a frame which is designated by the reference 220. This frame 220 allows the reading of the central part of substrates 10 and 11, while at the same time hiding the view of the external parts of substrates 10 and 11. As a result, the superpositions of conduction tracks and electrodes on the two substrates which would otherwise create visible lines in presence of a switching voltage, are hidden behind frame 220.

If the counter electrodes formed on substrate 10 are subdivided into several groups separated laterally from each other, one or several parts of conduction tracks 57a and 58a on substrate 11 may extend into these spaces seperating the groups of electrodes so as to approach the displaying electrodes 12 to 48. For example, FIG. 4 shows a part 57b of conduction track 57a which extends in the space separating the electrodes groups 110 to 114 and 115 to 119, (see also FIG. 3).

As a result, the narrow part 57c of conduction track 57a which is superposed on counter electrodes 114 may have a minimal length, the dimensions of the rest of conduction 57a being of maximal length. Thus, conduction track 57a may be obtained with greater reliability without any risk of rupture. If an electrode part, for example electrode part 79a, is positioned between two groups of counter electrodes, the part 57d of conduction track 57a which has maximal dimensions may extend into the separation space until the edge of the part electrode 79a before its width would have to be reduced to the part 57e.

Figure 5:
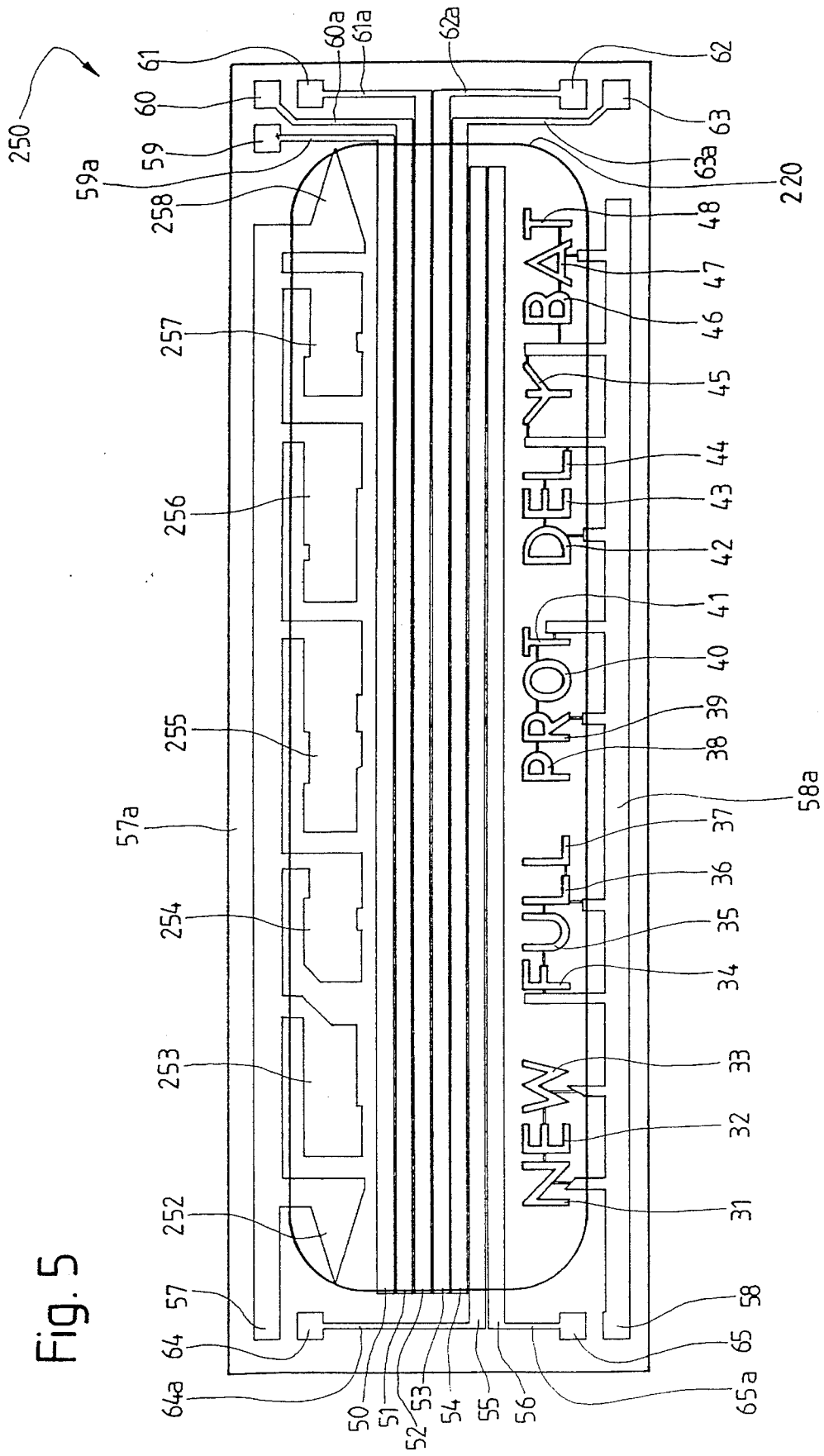
FIGS. 5 and 6 are plane views of first and second substrates of the second embodiment of the liquid crystal display device of the invention, these substrates also comprising respectively display electrodes and counter electrodes formed on one of their faces.
Figure 6:
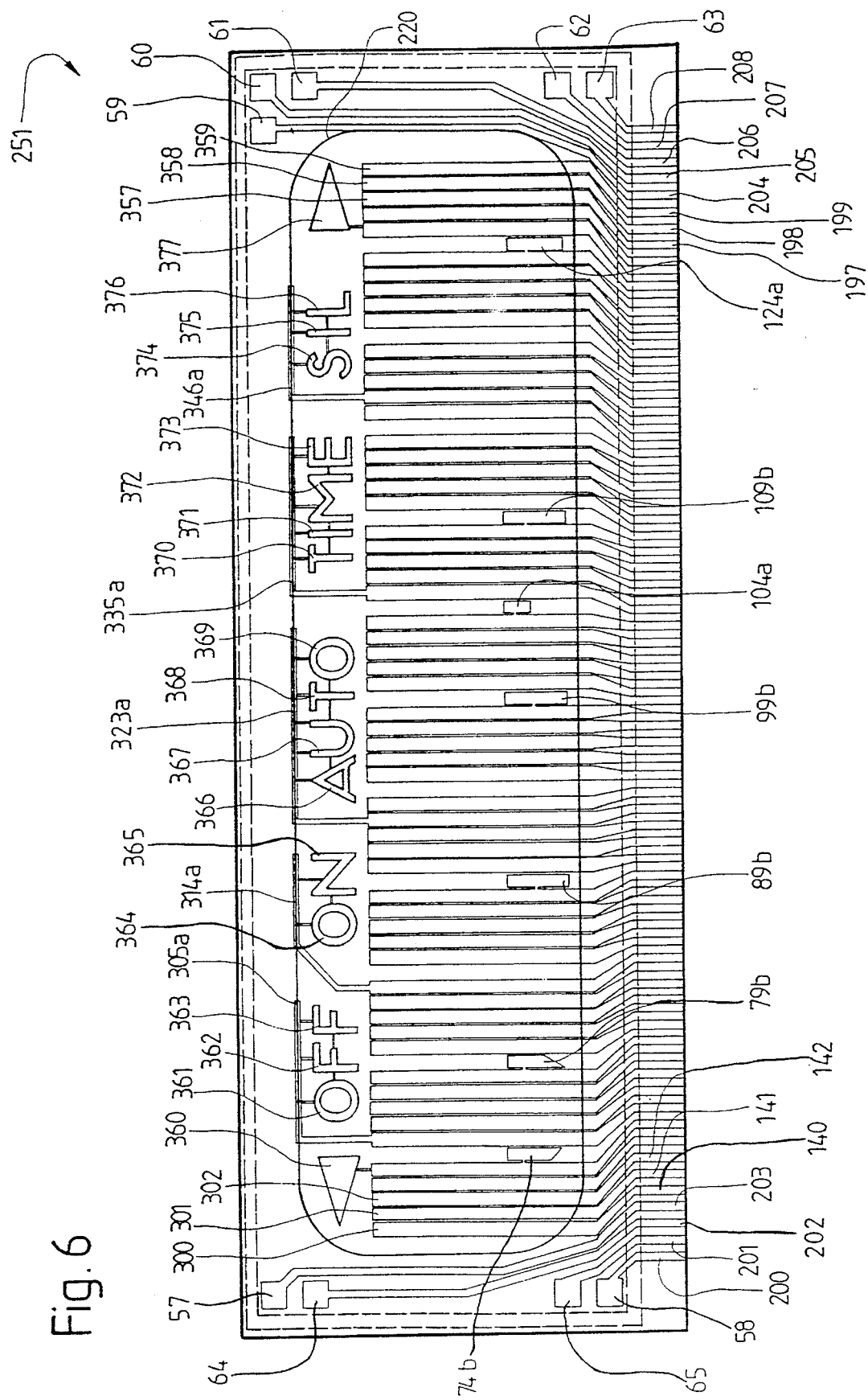

In the embodiment of the invention illustrated in FIGS. 3 and 4, the display electrodes intended to display fixed symbols are situated on the lateral edges of the set of display electrodes intended to display changeable symbols. In FIGS. 5 and 6, to which reference will be made now, plane views have been represented of a first front substrate 250 and a second back substrate 251 on which display electrodes intended to display fixed symbols are situated only on one of the two lateral edges of the set of display electrodes intended to display changeable symbols.

In FIG. 5, it can be seen that substrate 250 has, as is the case for substrate 11, first display electrodes such as the electrodes 31 to 48 arranged on one of its faces and intended to form fixed symbols having the shape of a letter ("N", "E", "W", etc.) or other fixed symbols, and second display electrodes designated by the references 252 to 258. Preferably, these second display electrodes 252 to 257 each have a shape corresponding to at least one group of several counter electrodes intended to display the fixed symbols. These counter symbols electrodes are formed on substrate 251.

Furthermore, on this same face of substrate 250, a set of second elongated display electrodes 50 to 56 is formed intended to form changeable symbols and which are juxtaposed on the face of substrate 250 according to a first general direction.

In this embodiment of the invention, all of the electrodes 252 to 258 are connected together at connection bridge 57 by way of conduction track 57a. In a similar manner, all of the electrodes 31 to 48 are connected together at connection bridge 58 by way of conduction track 58a and electrodes 50 to 56 are connected respectively to connection bridges 59 to 65 by way of conduction tracks 59a to 65a.

Furthermore, one of the faces of substrate 251 has a set of elongated counter electrodes intended to form changeable symbols in combination with electrodes 50 to 56. These counter electrodes are designated by references 300 to 359 and are juxtaposed on the face of substrate 251 according to a second general direction perpendicular to the first general direction. Preferably, these counter electrodes are in general rectilinear and extend only along a part of the width of the surface of substrate 250.

Moreover, terminals 140 to 199 are connected respectively to electrodes 300 to 359, while other terminals 200 to 208 are placed on substrate 251 to ensure connection with the electrodes of substrate 250, respectively by means of connection bridges 50, 65, 64, 57, 59, 60, 61, 62 and 63.

Counter electrodes intended to form fixed symbols are formed on the same face of substrate 251. These counter electrodes are designated by the references 360 to 378 and they each have the shape of a letter ("O", "F", "F", etc.) or some other fixed symbols. Preferably, they are all situated on the same lateral side of the set of display electrodes 50 to 56.

Several counter electrodes 300 to 359 are superposed on display electrodes 31 to 48 which are placed on the lateral side which is opposite to the set of display electrodes 50 to 56 so as to fonction respectively as counter electrodes for these.

Each of the counter electrodes 360 to 378 may be connected, either directly or indirectly, to one of the counter electrodes 300 to 359. In fact, as represented in FIG. 6, one or a plurality of conduction tracks 305a, 314a, 323a, 335a and 346a may be formed on the surface of substrate 251 to ensure a connection between the counter electrodes 360 to 378 and several of the counter electrodes 300 to 359. Conduction tracks 305a, 314a, 323a, 335a and 346a are connected respectively to counter electrodes 305, 314, 323, 335 and 346.

In FIG. 6, counter electrodes 360 to 378 are subdivided into groups of fixed symbols so as to display for example words such as "OFF", "TIME", etc. in case a switching voltage is applied to all of the counter electrodes of a selected group at the same time. In this case, all counter electrodes of a group, for example counter electrodes 361 to 363, may be connected to the same conduction track 305a, either directly or by way of another electrode in the group.

The counter electrodes formed on substrate 251 may also be subdivided into a plurality of groups of which each one, for example the electrodes 305 to 309, is intended to display a particular displaying symbol. These electrode groups may be separated laterally one from another. In the case that a part of at least one of display electrodes 31 t 48 is placed superposed on the space separating two groups of electrodes, the set of counter electrodes on substrate 251 may further comprise at least one electrode-part situated in this space so as to fonction as a part of a counter electrode for one of the display electrodes 31 to 48.

In the embodiment of FIGS. 5 and 6, counter electrode parts are designated by references 74*a*, 74*b*, 79*a*, 79*b*, 89*a*, 89*b*, 94*a*, 99*a*, 99*b*, 104*a*, 109*a*, 109*b*, 119*a* and 124*a*. Each of these electrode parts may be connected by a conduction track (non represented) to at least one of the adjacent counter electrodes.

Although the invention has been described and represented while referring to the embodiments of FIGS. 3 and 4 and of FIGS. 5 and 6 respectively, the specialists of this technology will easily understand that several modifications may be carried out to these without extending beyond the scope or the spirit of the invention.

For example, the back substrate and the front substrate can be substituted by each other. Finally, the display electrodes and the counter electrodes can be sustituted by each other without departing from the scope of the invention.

What is claimed is:

1. A display device comprising:

a first substrate and a second substrate spaced apart and facing each other, a liquid crystal film switchable being two states which are optically perceptible, said film being enclosed in the space delimited by said first and second substrates, at least a first display electrode formed on the face of said first substrate which faces said second substrate, a set of elongated display electrodes formed on the face of said first substrate facing said second substrate, and a set of elongated counter-electrodes formed on the face of said second substrate facing said first substrate, said counter-electrodes being superposed with said elongated display electrodes so as to be capable of displaying therewith symbols which are changeable by selective application of a switching voltage therebetween, said elongated display electrodes being juxtaposed in a first general direction across substantially the entire length of said first substrate, said counter-electrodes being juxtaposed across substantially the entire width of said second substrate and substantially their whole length in a second general direction perpendicular to said first general direction so as to create a matrix of display elements for forming said changeable display symbols, said counter-electrodes being also superposed with said first display electrode so as to create therewith a fixed display symbol when a switching voltage is applied therebetween, and the distance separating each adjacent counter-electrode being substantially less than the width of said first display electrode.

2. A display device according to claim 1, wherein said counter-electrodes are divided into a plurality of spaced-apart groups each for displaying an individual changeable display symbol, said set of counter-electrodes further comprising at least a counter-electrode part connected to an adjacent counter-electrode, said counter-electrode part being positioned in the space between adjacent groups of counter-electrodes.

3. A display device according to claim 1, further comprising:

at least an additional display electrode formed on the face of said first substrate facing said second substrate, said counter-electrodes being superposed with said additional display electrode so as to create a further fixed display symbol when said switching voltage is applied therebetween, said first display electrode and said additional display electrode being positioned on opposing lateral sides of said set of elongated display electrodes.

\* \* \* \* \*